US009053117B2

United States Patent
Trebas et al.

(10) Patent No.: US 9,053,117 B2
(45) Date of Patent: Jun. 9, 2015

(54) STORING APPLICATION DATA WITH A UNIQUE ID

(75) Inventors: David Trebas, Irvine, CA (US); Michael Brown, Colorado Springs, CO (US)

(73) Assignee: 4Clicks Solutions, LLC, Colorado Springs, CO (US)

( * ) Notice: Subject to any disclaimer, the term of this patent is extended or adjusted under 35 U.S.C. 154(b) by 88 days.

(21) Appl. No.: 13/444,532

(22) Filed: Apr. 11, 2012

(65) Prior Publication Data

US 2013/0275379 A1    Oct. 17, 2013

(51) Int. Cl.
*G06F 17/30* (2006.01)
*G06F 11/00* (2006.01)
*G06F 11/14* (2006.01)

(52) U.S. Cl.
CPC .......... *G06F 17/3012* (2013.01); *G06F 11/006* (2013.01); *G06F 11/1448* (2013.01)

(58) Field of Classification Search
CPC .............. G06F 17/30; G06F 17/30418; G06F 17/30997
USPC ................... 707/644, 638, 695, 999.1, 999.2, 707/999.203
See application file for complete search history.

(56) References Cited

U.S. PATENT DOCUMENTS

| | | | |
|---|---|---|---|
| 7,058,663 B2 | 6/2006 | Johnston et al. | |
| 7,865,485 B2* | 1/2011 | Mullick et al. | 707/704 |
| 8,566,301 B2 | 10/2013 | Rueben et al. | |
| 8,738,720 B2* | 5/2014 | De Kezel et al. | 709/206 |
| 8,788,590 B2 | 7/2014 | Culver et al. | |
| 2003/0112273 A1 | 6/2003 | Hadfield et al. | |
| 2005/0108330 A1 | 5/2005 | Sakaguchi et al. | |
| 2006/0031235 A1* | 2/2006 | Foresti et al. | 707/100 |
| 2007/0067358 A1* | 3/2007 | Barrs et al. | 707/203 |
| 2007/0220415 A1 | 9/2007 | Cheng et al. | |
| 2009/0182763 A1 | 7/2009 | Hawking | |
| 2010/0145985 A1* | 6/2010 | Takahashi | 707/769 |
| 2010/0306524 A1* | 12/2010 | Runkis et al. | 713/150 |
| 2012/0110470 A1* | 5/2012 | Mistry et al. | 715/748 |
| 2012/0188940 A1* | 7/2012 | Agrawal et al. | 370/328 |
| 2012/0317155 A1* | 12/2012 | Ogasawara et al. | 707/812 |
| 2013/0117505 A1* | 5/2013 | Fiske et al. | 711/114 |
| 2013/0275379 A1* | 10/2013 | Trebas et al. | 707/644 |
| 2014/0025767 A1* | 1/2014 | De Kezel et al. | 709/206 |

FOREIGN PATENT DOCUMENTS

| | | | | |
|---|---|---|---|---|
| EP | 1006463 A2 * | 6/2000 | ............. | G06F 17/30 |
| GB | 2433614 A | 6/2007 | | |

OTHER PUBLICATIONS

Google Wave Protocol, Google Wave API Overview, http://waveprotocol.org/wave-apis, website retrieved Sep. 19, 2012, 4 pages, Jan. 25, 2015.

* cited by examiner

*Primary Examiner* — Jean M Corrielus
(74) *Attorney, Agent, or Firm* — TraskBritt P.C.

(57) ABSTRACT

A method, system, and apparatus for storing data in a cloud environment that enables a multi-user interface, automatic data backup, and has a schema-less data storage. A data storage database may be provided in the cloud to store one or more data objects. A data management module may be configured to assign each data object a unique ID, wherein each unique ID comprises a timestamp with a granularity between about 0.1 millionths of second and 50 millionths of a second with each ID guaranteed to be unique without regard to the number of servers assigning IDs. A data backup module may be configured to create a new data object with a unique ID in response to a request to modify an original data object, wherein the original data object remains stored with its unique ID.

19 Claims, 5 Drawing Sheets

STORING APPLICATION DATA WITH A UNIQUE ID

TECHNICAL FIELD

Embodiments of the present disclosure generally relate to improving application data storage and usage. More specifically, embodiments of the present disclosure relate to storing application data in a cloud in a persistent manner.

BACKGROUND

Historically, storing data has been expensive. For that reason, companies have had to hire employees whose sole purpose was to maintain databases and delete obsolete information. Over time, storage has become increasingly inexpensive. However, the vast majority of programmers have maintained the mindset accompanying expensive storage, which has led to the sacrifice of efficiency and reliability in order to minimize the amount of data being stored. For example, programmers may write programs that only save the most recent version of any given data while deleting older versions of data. Deleting old versions of data is no longer necessary because there is no longer a significant cost associated with storing them. Although the practice of saving only the most recent version of data is functional, it also limits the manner in which application data may be stored and preserved. In some instances, it limits data from being automatically backed up at all points in time. For example, using conventional systems, data storage managers may be forced to regularly back up files and databases to preserve data. Sometimes, this includes extensive manual operations and typically still fails to preserve every instance of changed data that has taken place.

Some conventional data storage methods have attempted to store data in a cloud (remote storage sites typically accessed across a network that does not require end-user knowledge to utilize). However, such data storage methods do not enable multi-user interfacing, because different users concurrently attempting to change stored data presents data reliability problems. Furthermore, conventional storage methods typically utilize schema-based storage that requires storing the data in a particular format and structure, which limits the functionality of the storage databases that are being used. Additionally, conventional storage methods often require specific language formats that may result in incompatibility or translation needs between an application and a server.

BRIEF SUMMARY OF THE INVENTION

The present disclosure includes embodiments that resolve many of the issues found in the art of data storage. Specifically, embodiments are described for implementing data storage in the cloud that allows for a multi-user interface, includes automatic data backup, and/or has a schema-less data storage environment. The embodiments overcome many or all of the shortcomings of the art described above.

The embodiments of the invention include methods, systems, and apparatuses for storing data in a cloud. One embodiment of the apparatus may include a data storage database within a cloud configured to store one or more data objects. The apparatus may also include a data management module that assigns to each data object a unique ID, wherein each unique ID comprises a timestamp with a granularity between about 0.1 millionths of a second and 50 millionths of a second. The apparatus may also include a data backup module that creates a new data object with a unique ID in response to a request to modify an original data object, wherein the original data object remains stored with its unique ID.

The system may further include a server configured to communicate with the data storage database and one or more clients configured to communicate with the server. The method may include steps associated with the apparatus and system. In one embodiment, the method may include: storing one or more data objects in a cloud; assigning each data object a unique ID, wherein each unique ID comprises a timestamp with a granularity between about 0.1 millionths of a second and 50 millionths of a second; and creating a new data object with a unique ID in response to a request to modify an original data object, wherein the original data object remains stored with its unique ID.

BRIEF DESCRIPTION OF THE DRAWINGS

In the drawings, which illustrate what is currently considered to be representative embodiments for carrying out the invention.

DETAILED DESCRIPTION OF THE INVENTION

Many of the functional units described in this specification have been labeled as modules in order to more particularly emphasize their implementation independence. For example, a module may be implemented as a hardware circuit comprising custom VLSI circuits or gate arrays, off-the-shelf semiconductors, such as logic chips, transistors, or other discrete components. A module may also be implemented in programmable hardware devices, such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, refer to the same embodiment.

In the following detailed description, reference is made to the accompanying drawings, which form a part hereof, and in which is shown, by way of illustration, specific embodiments in which the invention may be practiced. These embodiments are described in sufficient detail to enable a person of ordinary skill in the art to practice the invention. However, other embodiments may be utilized, and structural, logical, and electrical changes may be made without departing from the scope of the invention. The illustrations presented herein are not meant to be actual views of any particular device or system, but are merely idealized representations that are employed to describe embodiments of the present disclosure. The drawings presented herein are not necessarily drawn to scale. Additionally, elements common between drawings may retain the same or have similar numerical designations.

Figure 1:
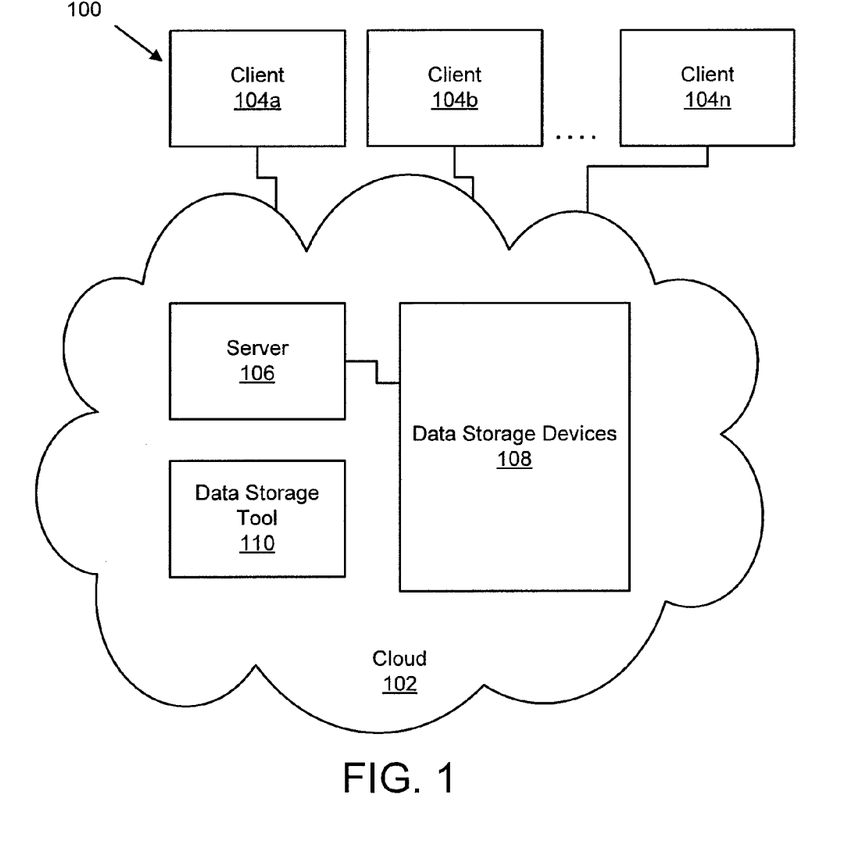
FIG. 1 is a schematic block diagram of one embodiment of a system for storing data in accordance with the present invention.

FIG. 1 depicts one embodiment of a system 100 for storing data in a cloud 102 in accordance with the present invention. A cloud 102, as used herein, refers to the application(s) and hardware that allow users to store information remotely via the internet or other network types. Typically, the cloud 102 includes servers, databases, processors, and other types of devices that are not visible to an end-user, but which operate behind the scenes to provide services to the end-user such as data storage and processing capabilities.

The system 100 includes one or more clients 104a-n that communicate with the cloud 102 by electronically passing information to and from the cloud 102. In various embodiments, the clients 104a-n may include various types of electronic devices that typically each include a memory and a processor. As will be recognized by one of skill in the art, each client 104a-n may comprise a device such as a personal computer, laptop, server, personal digital assistant (PDA), cell phone, smart phone, or the like. In one embodiment, the clients 104a-n are configured to access the cloud 102 for data storage or other purposes. In at least one embodiment, the clients 104a-n may be configured to run web applications using a browser such as INTERNET EXPLORER®, MOZILLA® FIREFOX®, SAFARI® or the like. In accordance with the present invention, the clients 104a-n are configured to store data in the cloud 102.

As depicted, the cloud 102 may include a server 106 that communicates with the clients 104a-n. The cloud 102 may also include data storage devices 108 configured to store data received from the clients 104a-n by way of the server 106. Of course, this is a simplified depiction of cloud computing and, in further embodiments, additional servers, data storage device, and other computing devices may be included in the cloud 102. In various embodiments, the data storage devices 108 may comprise a data storage database configured to store one or more data objects. The term data object, as used herein, refers to a data structure that encapsulates data in a useful format. Typically data objects may be manipulated by a programming language and may be passed from the clients 104a-n to the cloud 102 for storage or manipulation. One example of a data object as used herein is a JAVASCRIPT® Object Notation (JSON) object. A JSON object is a lightweight text-based open standard designed for human-readable data interchange. It is derived from JAVASCRIPT® for representing simple data structures and associative arrays and relationships. Although it is derived from JAVASCRIPT®, JSON objects are language independent, because parsers are available for most programming languages. Another example of a data object is a blobject. Blob is the acronym for binary large object and will be explained in further detail below.

A data storage tool 110 may be included for implementing data storage in the cloud 102 in accordance with the present invention. Generally, the storage tool 110 enables data storage in the cloud 102 that includes a multi-user interface for allowing concurrent data storage, implements automatic backup by maintaining a historical timeline of previously stored data objects, and/or that implements schema-less data storage that allows for expansive linking of data records and sub-records.

Conventional multi-user data storage systems have had concurrency problems where two different users tried to modify the same data object at the same time. The result is a data conflict in which a user could not be certain that the saved data was the most recent version. In order to allow multiple users to store data in a scalable way, the data storage tool 110 resolves the problem of concurrent data storage by measuring time with a very fine granularity. In one embodiment, the data storage tool 110 is configured to measure time in intervals of between about 0.1 millionths of a second and 50 millionths of a second. In further embodiments, the data storage tool 110 is configured to measure time in intervals of between about 0.1 millionths of a second and 15 millionths of a second. In yet another embodiment, the data storage tool 110 is configured to measure time in intervals of about 10 millionths of a second. By measuring time with a very fine granularity, the majority of multi-user problems can be eliminated, because there will be very few instances of users saving changes to data within the same 10 millionths of a second. In the event that they do, the data storage tool 110 may be configured to accept the latter of the changes.

When a data object is created, typically the server's internal clock is accessed to make a time stamp for the data object. Modern day processors run fast enough (over 100 million instructions per second) that it is now possible to generate timestamps at very fine resolutions. However, even with faster processors, making a call in a high level language still incurs overhead. If only a single server is operating, each record may receive a unique time stamp, because the call to get and return the stamp may take longer than, for example, 10 millionths of a second. In some embodiments, the process of creating new data object timestamps on each single server is limited to about 100,000 per second. As multiple servers are added, each new server is given a unique sequential index which is used as a modulus factor to round the timer. Even with hundreds of thousands of servers running, each will always generate a unique ID for new objects because the objects' IDs may be configured to be a factor of the clock tick rounded to the nearest integer value of a server's sequential location in the current cloud.

As new servers are added to the cloud 102, each server 106 may receive a unique index identifier. Therefore, not only does the finer granularity of time measurement enable for concurrent usage, it also enables for the creation of unique identifiers (IDs) that may be assigned to data objects as they are created. These unique IDs may be used to distinguish the data objects from one another. Using a fine granularity timestamp to ensure uniqueness provides a way for millions of unique records to be created by hundreds of thousands of servers without any direct connection between the servers. In some embodiments, it works even when server clocks are only marginally synchronized. Such functionality is not practiced by conventional data storage systems.

The data storage tool 110 utilizes the unique IDs of each data object to implement automatic data backup. Because data storage has become inexpensive, the data storage tool 110 is able to store every change made to any object in a timeline fashion. When a new data object is created for storage in the cloud 102, the data object may be stored with its unique ID. The unique ID may include the fine granularity time stamp described above (also referred to herein as point in time) as well as other information such as who created or modified the data object and when the object expired (for previous versions). By default, the data storage tool 110 returns the latest version of any object in response to a data retrieval request. However, users can specify a specific date/time and view the object as it was at that point in time by accessing the timestamp associated with each data object. The user then has the option to restore the object to a previous condition, if desired. Thus, data is never lost and can easily be retrieved. When a user modifies a previously stored data object, the previous data object is not replaced or deleted, but a new version of the data object is created and a previous version continues to be stored for future reference. The result is a timeline or history of each data object that provides a backup of every data object change and that prevents users from accidentally or maliciously deleting data.

Figure 2:
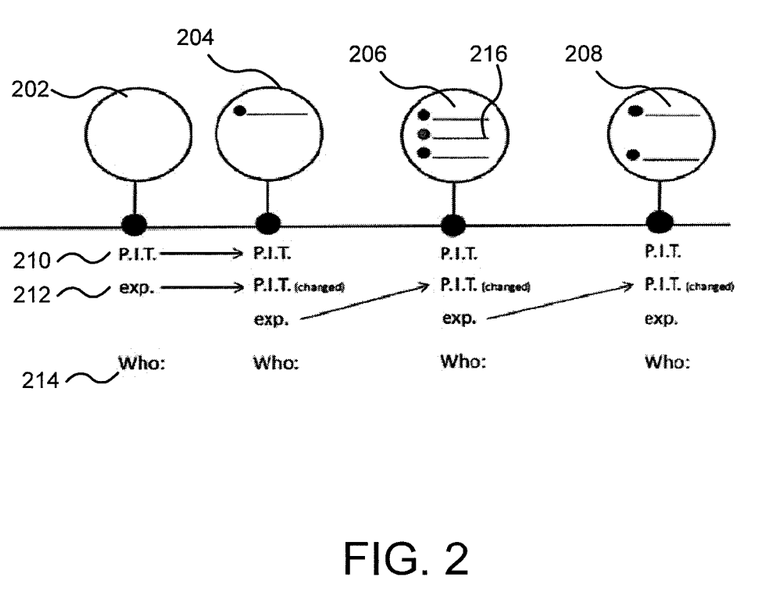
FIG. 2 is a schematic block diagram of one embodiment of a timeline associated with a data object and its unique identifier in accordance with the present invention.

FIG. 2 depicts one embodiment of a timeline for a data object 202 in accordance with the present invention. The timeline includes an original version 202 of a file, a second version 204, a third version 206, and a fourth version 208. By way of example, suppose that on Dec. 23, 2011, at 10:30 am, an original file 202 was created. The data storage tool 110 automatically saves it and uses its time of creation (down to, for example, about 10 total millionths of a second) as its unique ID. It also sets a tentative expiration date, even though the original file 202 will not expire until a newer second version 204 is saved. At that point, the prior version 202 is archived and is still fully accessible by its unique ID. In the depicted embodiment, there are four criteria for a unique ID: The Point in Time (PIT) or timestamp 210, the expiration date (EXP) 212, who modified/created the file 214, and any secondary ID the user may have assigned (not depicted). The expiration date 212 is the date when a newer version is created and saved. Thus, a first instance of a data object 202 will simply have a null or tentative expiration date 212. Accordingly, two files will not be saved at the same time, because the fine granularity of the timestamp prevents that from happening. Each time the data object 202 is modified, a new version 204-208 is created with a new unique ID, and the previous version continues to be stored for future reference.

As depicted, the third version 206 of the data object adds two lines of additional data 216, and then the fourth version 208 is modified to remove one of the lines of data. However, the deleted line of data in the fourth version 208 is not lost because it is still accessible in the third version 206 which continues to be stored in the cloud 102. In this manner, data is automatically backed up and cannot be deleted. Furthermore, a record may be kept of who made what changes to each data object. This feature adds another element of security for users and companies. Should an enraged employee delete all of his or her files from the system, all s/he will have done is changed the most recent versions of those files. The company could not only restore all of the data, but it could also track what employee made the changes at what day and time. Additionally, a user may quickly and easily view the timeline of a data object for troubleshooting or other purposes.

In one embodiment, the data storage tool 110 implements schema-less data storage. A schema is conventionally used to describe the structure of a database in a formal language to define how a database is to be constructed. However, a schema can also limit the manner in which data is stored. Thus, the data storage tool 110 may implement a schema-less database such that any record can be linked to any other record, or any sub-record can be linked to any sub-record. This means there are no restrictions on how the data is arranged, connected, or placed.

The data storage tool 110, in one embodiment, uses JSON objects as the core records for the database. This enables access to the power and versatility of the JAVASCRIPT® language which is used to support many web applications without having to translate between different programming languages. In some embodiments, no translation of any type is required for the server to communicate with the clients 104a-n where both the server 106 and data storage devices 108 are configured to handle JSON objects. Thus, the servers 106 used may be programmed to receive and serve up JSON objects, allowing them to perform considerably faster by bypassing traditional translation requirements associated with some conventional storage systems.

Figure 3:
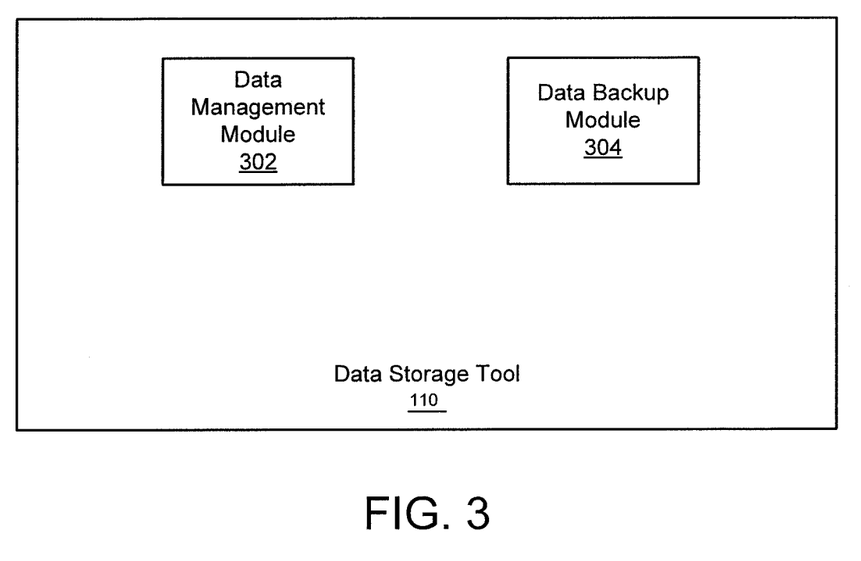
FIG. 3 is a schematic block diagram of one embodiment of a data storage tool in accordance with the present invention.

One embodiment of the data storage tool 110 is depicted in FIG. 3. In the depicted embodiment, the data storage tool 110 includes a data management module 302 and a data backup module 304. Of course, in further embodiments, more or fewer modules may be used, or the modules may be combined or modified to implement the functionality of the data storage tool 110 as described above. The data storage tool 110 may operate with, on, or across multiple devices including clients 104a-n, servers 106, and data storage devices 108, as well as other devices, as desired. The data storage tool 110 may communicate with a data storage database stored in the cloud 102 wherein the data storage database is configured to store one or more data objects.

In one embodiment, the data management module 302 assigns each data object stored in the data storage database a unique ID, wherein each unique ID comprises a timestamp with a granularity between about 0.1 millionths of a second and about 50 millionths of a second. The data management module 302 may access a clock of a server 106 or other device to generate the timestamp of the unique ID. In further embodiments, the unique ID assigned by the data management module 302 may include a user identifier that indicates an identity of a user that created/modified the data object. The unique ID may also include an expiration date of the data object as well as other user defined criteria. Once the unique ID is assigned to a data object, the data object may be stored in the database with its unique ID. The data object may then be referenced by data calls and operations received from one or more clients 104a-n to modify the data object.

The data backup module 304 creates a new data object with a unique ID in response to a request to modify an original data object. Thus, instead of replacing the original data object, the original data object remains stored with its unique ID and the new data object becomes the most current version of the data object and is identified by its own unique ID. Each time a new version of the data object is created (in response to a modification), the data backup module 304 maintains all of the previous versions of the data object in the database for future reference or restoration.

Figure 4:
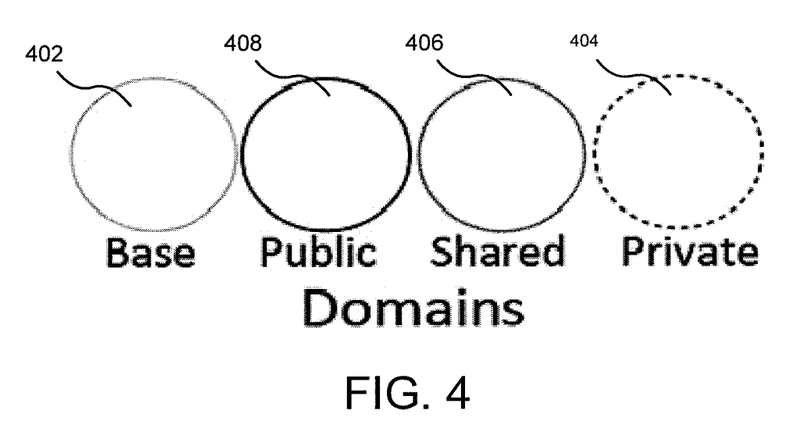
FIGS. 4 and 5 are flow chart diagrams of embodiments of methods for storing data in accordance with the present invention.

FIG. 4 depicts one embodiment of various types of storage domains that may be utilized in accordance with the present invention. Domains can be thought of as the next largest unit of storage after the cloud 102. In the depicted embodiment, there are four different kinds of domains: base 402, private 404, shared 406, and public 408. A base domain 402 serves as a reference for another domain. A user accessing a public domain 408 would be viewing information relayed from its base domain 402. Public, shared, and private domains 404-408 each use base domains 402. A public domain 408 is accessible to anyone. A shared domain 406 can be accessed by multiple users, but those users have to be authorized to do so. Private domains 404 are typically reserved for single users, protected with username and password.

Because domains have no predefined rules, they are very robust and versatile, and they can store any data usable by any computer language. Domains may be used to enable more efficient storage in accordance with the functionality of the data storage tool 110. Domains may be used to store very complex data sets in data containers, and those data sets are often linked to one another. The generalized definitions of data containers enable the linking between data sets. Each domain has a certain amount of security integrated into it. Because the three other types of domains all use base domains, information associated with those domains is secure and cannot be changed by users lacking administrative privileges. Shared and private domains share an added measure of security. In some embodiments, only invited users can access a shared domain 406, and only a specific username and password can access a private domain 404. The chief administrator typically has the ability and authority to access any domain.

Base domains 402 can be accessed by authorized administrators. Most content is usually stored in a base domain 402, and other domains typically refer back to a base domain 402 for the information they use or make available. They refer back to a base domain 402 or other domain in the form of a pointer, or a function that redirects the current domain to another location to retrieve the requested information. Code or files that refer to information from a domain will typically search that domain for the information first. If it is not there, they will search the source domain (an example might be a private domain; if a file referred back to the private domain 404 and still could not find what it needed, it would then search that domain's base domain). This manner of searching is advantageous because it's more thorough than most. Someone who accidentally moved a file from their private domain 404 to the base domain 402 would still be able to access it. In conventional systems, the reference to the file would be invalid until the user moved the file back from the base domain 402 to the private domain 404.

Shared domains 406 can be thought of as private domains 404 that users can grant others permission to view. They function similarly to private domains 404 in that users must be authorized to access the domain. If a shared domain 406 belonged to User A, only people invited by User A could access it. Invitations may be sent in an email, for example, and a link in that email would allow him to access the shared domain 406. When any user logs on, s/he may be given a session ID (this keeps the user from having to repeatedly log on). The link in the email assigns the user a new session ID which provides authorization to access the shared domain 406.

Public domains 408 typically have content and information readily available for the public. The two security measures they employ are reserving editing privileges for administrators and using base domains 402 to hold their information. Anyone can access the information and anyone can use the information. The various types of domains interact with one another and may be linked back to an administrator who is authorized to manage all domains.

The data storage tool 110 may use various different programming languages to implement its functionality. In one embodiment, languages such as JAVASCRIPT®, C++, C#, JAVA®, and VISUAL BASIC® and/or language extensions such as JQUERY®, JQUERY-UI® and JKARATE®, may be used to access the JSON data. Conventional browsers are often incompatible with one another. JQUERY® is a JAVASCRIPT® library that provides a browser-neutral way to walk the document object model (DOM). Its method of walking the DOM is very efficient and powerful, because it provides very short commands that allow the user to incorporate visual effects, manipulate page elements, and implement AJAX calls. Because of JQUERY®, JAVASCRIPT® programmers no longer have to include special code for each different browser they want to use.

JKARATE® is a powerful JAVASCRIPT® extension that adds object oriented features such as multiple inheritance, messaging and polymorphism. It was designed to add the robust object oriented features found in more traditional languages such as C++. One advantage of JKARATE® is that it is unnecessary to specify what object you're referring to when initiating or receiving a message. That means you can program object-oriented code using a modular, dynamically loaded approach and implement these advanced object oriented capabilities in any application.

JSON enables compatibility between browsers and servers. For many years, browsers and servers used different programming languages. Time consuming and costly translations were often needed for servers to communicate with browsers. JSON makes it possible to send JAVASCRIPT® objects to the server in a form called a JSON packet. The server may also return JSON packets. One of the greatest benefits to come from this was the ability for the browser to immediately use the JSON packet because it could read the object it was being sent without translation. If the programmer felt so inclined, s/he could write JAVASCRIPT® programs that would immediately use the data as returned by the server. In at least one embodiment, the server 106 is configured to communicate with the clients 104a-n by passing JSON packets there between. It also removes the requirement that the server translates the incoming/outgoing JSON packets to/from a traditional database. JSON is the native format of the data being stored in the cloud.

In addition to JSON objects, the data storage tool 110 may utilize data objects in the form of blobjects. A blobject can store any kind of information. Blobjects may be used to send and receive JSON packets to and from the server. Or to send and receive binary data such as images or traditional computer file. Blobjects can be pointed to or linked to other blobjects. Directories and trees can be constructed using blobjects. There are two types of blobjects: regular blobjects and blobject lists. A regular blobject can store any number of JSON Data packets, JAVASCRIPT® code objects, CSS information, HTML™ information, or any other kind of code or information the programmer cares to include. Blobject lists contain a list of references to other blobjects or information. They become extremely powerful when their list of references refers to other blobjects or blobject lists. Using blobject lists, a user could create directories or information trees. Blobjects function like Legos—they're versatile because they can connect with any other blobject and, using blobjects and blobject lists, they can create a finished Lego building. The major difference is that a linked web of blobjects would be able to create new blobs or carry out massive functions/functionality.

By using these programming languages and data structures, the data storage tool 110 may implement an expansive data storage system that enables concurrent multi-user functionality, automatic backup, and a schema-less data storage system that allows servers and web applications to communicate without substantial language translation required.

Figure 5:
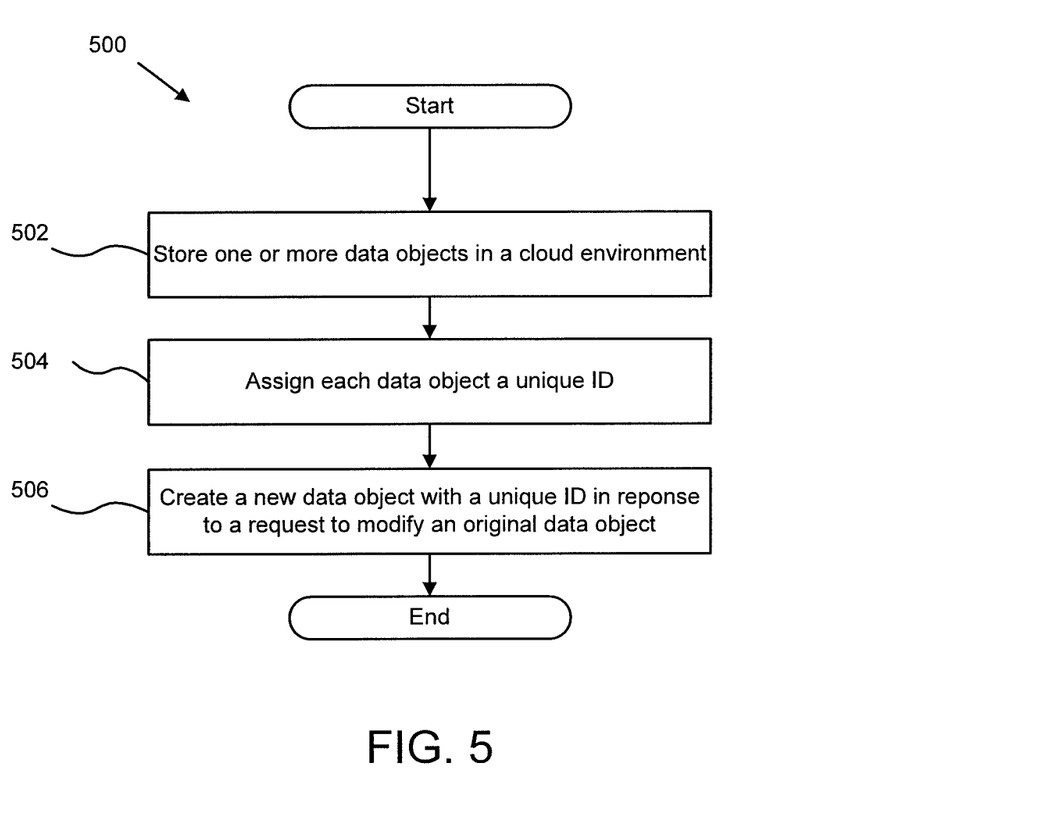

FIG. 5 depicts one embodiment of a method 500 for storing data. The method 500 substantially includes and relates the embodiments and implementations described above with regard to FIGS. 1-4.

The method 500 begins when one or more data objects are stored in a cloud 502. Next, a data management module 302 assigns each data object a unique ID 504, wherein each unique ID comprises a timestamp with a granularity between about 0.1 millionths of a second and 50 millionths of a second. Then, a data backup module 304 creates a new data object with a unique ID in response to a request to modify an original data object 506, wherein the original data object remains stored with its unique ID.

In a further embodiment, the method 500 may include retrieving a data object from the cloud in response to a request for retrieval of the data object, wherein the request for retrieval of the data object from the cloud by default results in retrieval of the data object with the most recent timestamp. In another embodiment, the method 500 may include retrieving a data object from the cloud in response to a request for retrieval of the data object at a particular time in history, and wherein the version of the data object as it existed at the particular time is retrieved. In yet a further embodiment, the method may include restoring a data object to a previous version of the data object in response to a request to restore the data object to the previous version of the data object.

These methods may be practiced in some embodiments with fewer steps or in a different order than are shown. Many additions, deletions, and modifications to the preferred embodiments may be made without departing from the scope of the invention as hereinafter claimed. Further, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of storing data, the method comprising:
   storing one or more data objects in a cloud;
   assigning and storing in the cloud a unique ID for each data object of the one or more data objects, wherein each unique ID comprises a timestamp derived from a clock tick of the server generating the timestamp, wherein the timestamp includes a granularity between about 0.1 millionths of a second and 50 millionths of a second; and
   creating and storing in the cloud a new data object as a copy of an original data object but with a different unique ID in response to a request to modify the original data object, wherein the original data object remains stored with its unique ID;
   wherein the assignment of each unique ID is guaranteed to be unique amongst a plurality of servers and with no need for each server of the plurality to communicate with the others when assigning unique IDs by assigning a unique index to each server and using the unique index of each server as a modulus factor to round the timestamp from that server to a nearest integer value of the unique index.

2. The method of claim 1, wherein the timestamp has a granularity of about 10 millionths of a second.

3. The method of claim 1, wherein the unique ID of each data object further comprises a user identifier that indicates an identity of a user that created the data object.

4. The method of claim 1, further comprising retrieving a data object from the cloud in response to a request for retrieval of the data object, wherein the request for retrieval of the data object from the cloud by default results in retrieval of the data object with the most recent timestamp.

5. The method of claim 1, further comprising retrieving a data object from the cloud in response to a request for retrieval of the data object at a particular time in history, and wherein the version of the data object exists at the particular time the data object is retrieved.

6. The method of claim 1, further comprising restoring a data object to a previous version of the data object in response to a request to restore the data object to the previous version of the data object.

7. The method of claim 1, wherein the cloud comprises a schema-less database.

8. The method of claim 7, wherein the schema-less database is comprised of JAVASCRIPT® Object Notation (JSON) objects.

9. An apparatus for storing data, the apparatus comprising:
   a data storage database within a cloud configured to store one or more data objects including a unique ID;
   a data management module that assigns each data object the unique ID, wherein each unique ID comprises a timestamp with a granularity between about 0.1 millionths of a second and 50 millionths of a second, wherein each unique ID is assigned by assigning a unique index to each server of a plurality of servers and using the unique index of each server as a modulus factor to round the timestamp from that server to a nearest integer value of the unique index; and
   a data backup module that creates and stores a new data object as a copy of an original data object but with a unique ID in response to a request to modify the original data object, wherein the original data object remains stored with the unique ID.

10. The apparatus of claim 9, wherein the data storage database comprises one or more domain types.

11. The apparatus of claim 10, wherein the data storage database comprises at least one base domain type, at least one public domain type, at least one shared domain type, and at least one private domain type.

12. The apparatus of claim 11, wherein each domain type comprises one or more blobjects.

13. The apparatus of claim 9, wherein the data storage database is a schema-less database comprised of JAVASCRIPT® Object Notation (JSON) objects.

14. A system for storing data, the system comprising:
   a data storage database within a cloud configured to store one or more data objects including a unique ID;
   a server configured to communicate with the data storage database; one or more clients configured to communicate with the server;
   a data management module that assigns each data object stored in the data storage database a unique ID and stores the unique ID in the data storage database, wherein each unique ID comprises a timestamp with a granularity between about 5 millionths of a second and 15 millionths of a second, wherein each unique ID is assigned by assigning a unique index to each server of a plurality of servers and using the unique index of each server as a modulus factor to round the timestamp from that server to a nearest integer value of the unique index; and
   a data backup module that creates a new data object as a copy of an original data object but with a unique ID in response to a request to modify the original data object, wherein the original data object remains stored with the unique ID.

15. The system of claim 14, wherein the data storage database is a schema-less database comprised of JAVASCRIPT® Object Notation (JSON) objects.

16. The system of claim 14, wherein the data storage database is configured to be accessible simultaneously by a plurality of users.

17. The system of claim 14, further comprising one or more clients configured to store data in the data storage database wherein each client has concurrent access to the data storage database.

18. The system of claim 17, wherein each client comprises a web application configured to communicate with the data storage database.

19. The system of claim 14, wherein the timestamp comprises a date and a time.

\* \* \* \* \*